J. W. SCHLEICHER & F. M. BOYER.
MACHINE FOR CUTTING BOXES.
APPLICATION FILED JULY 19, 1915.
1,206,925.
Patented Dec. 5, 1916.
7 SHEETS—SHEET 2.
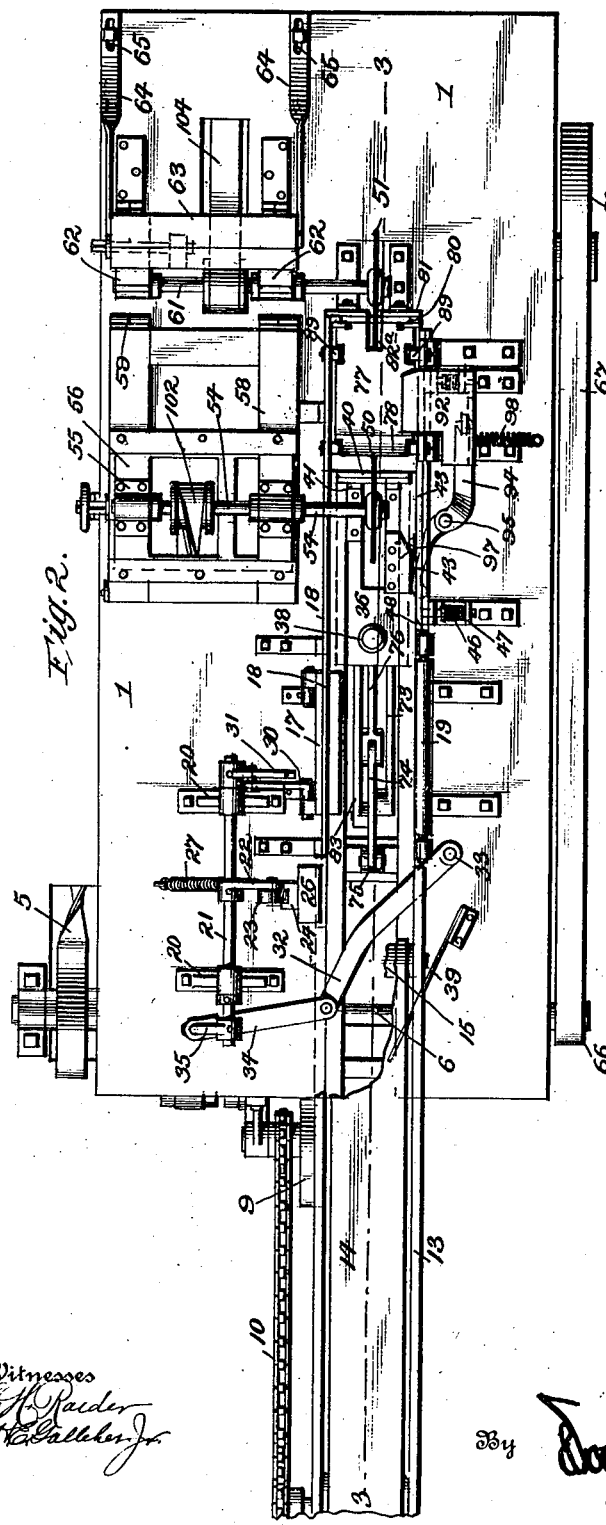
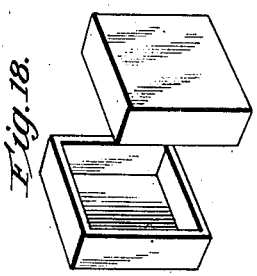
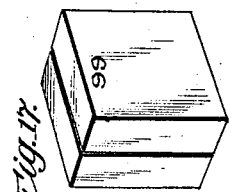
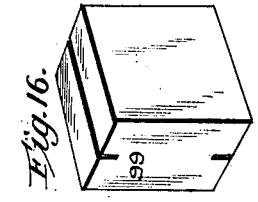
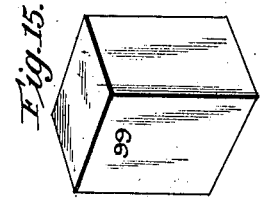
Witnesses
Inventors
John W. Schleicher
Frank M. Boyer,
By
Attorneys

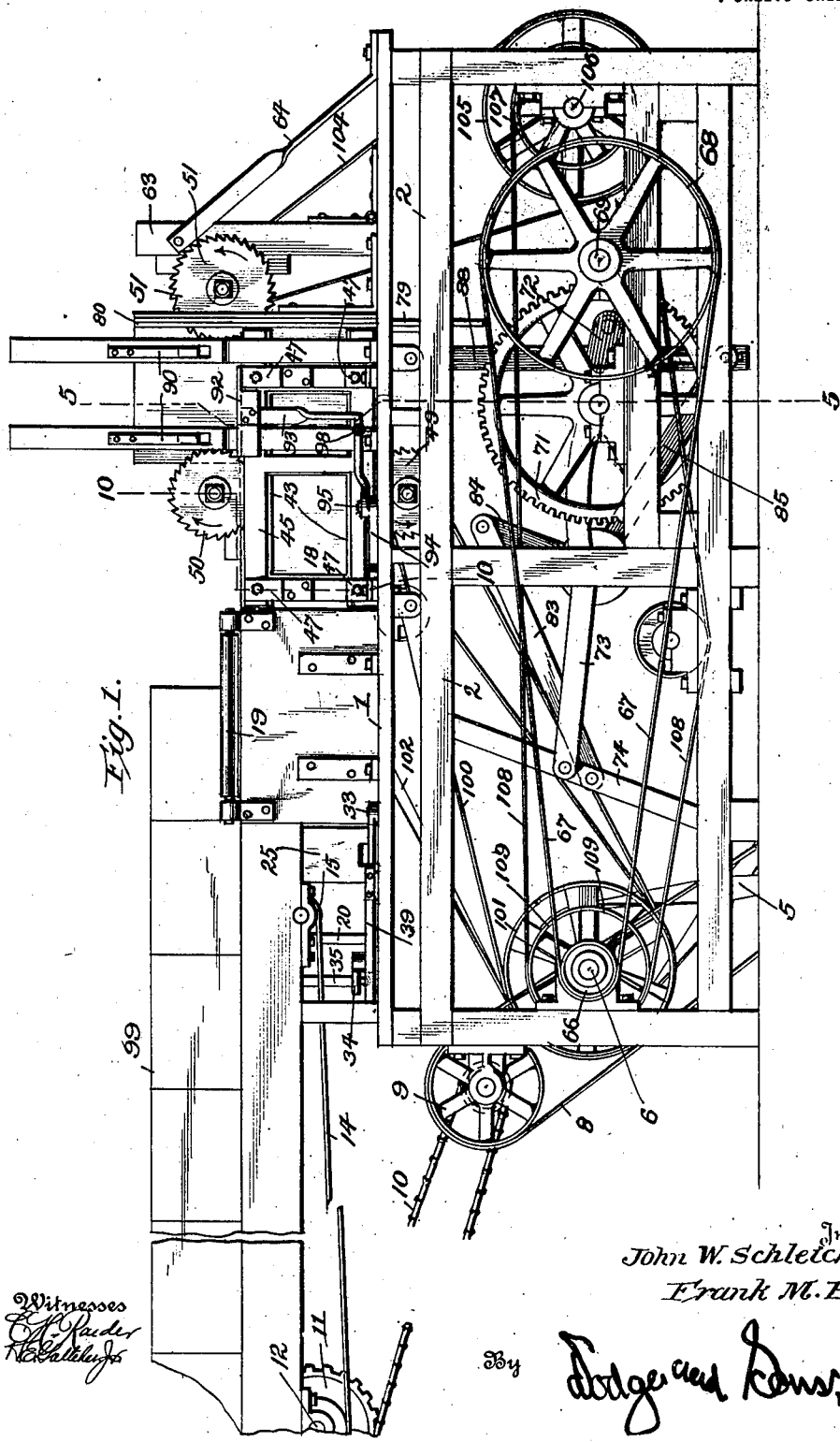

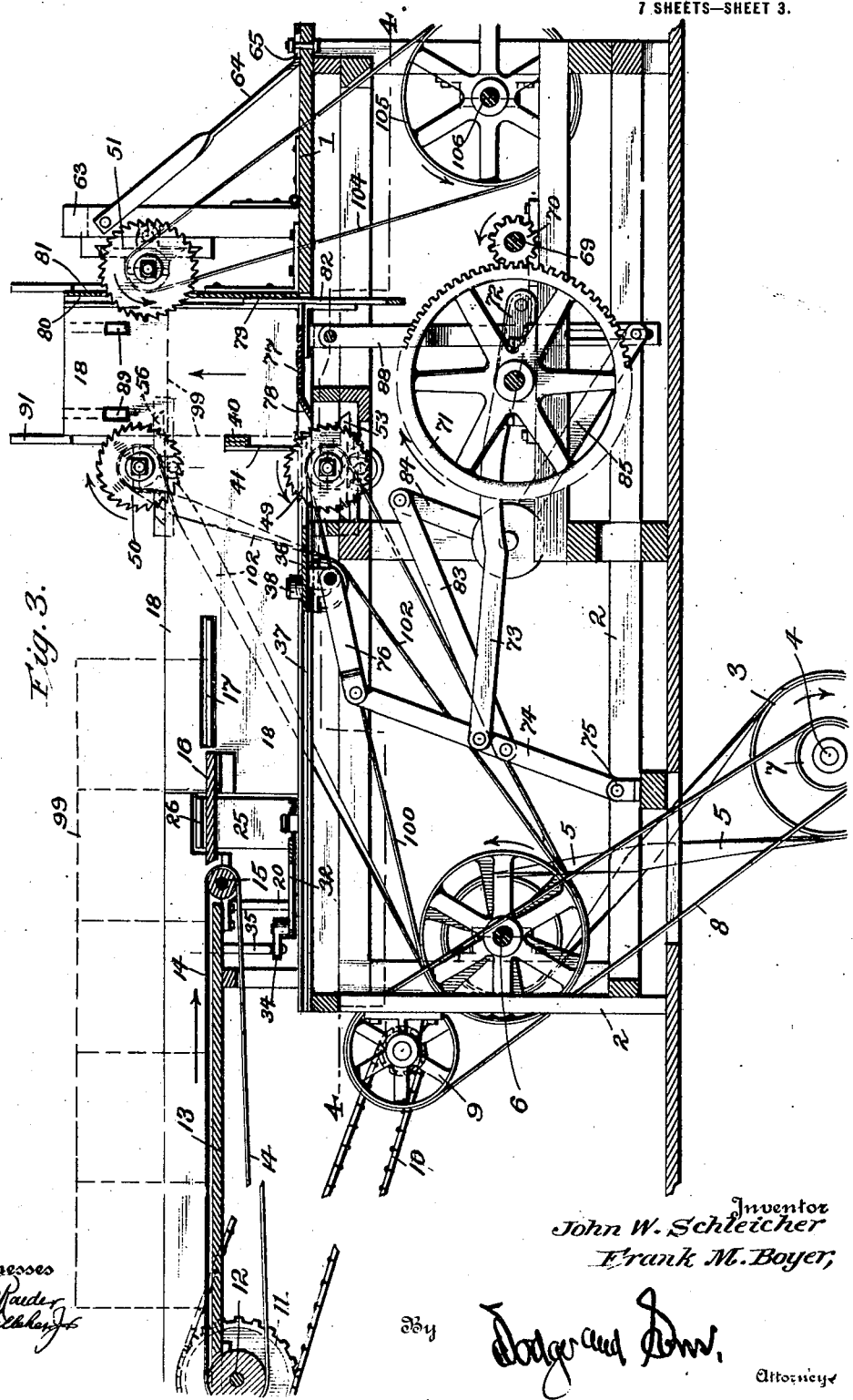

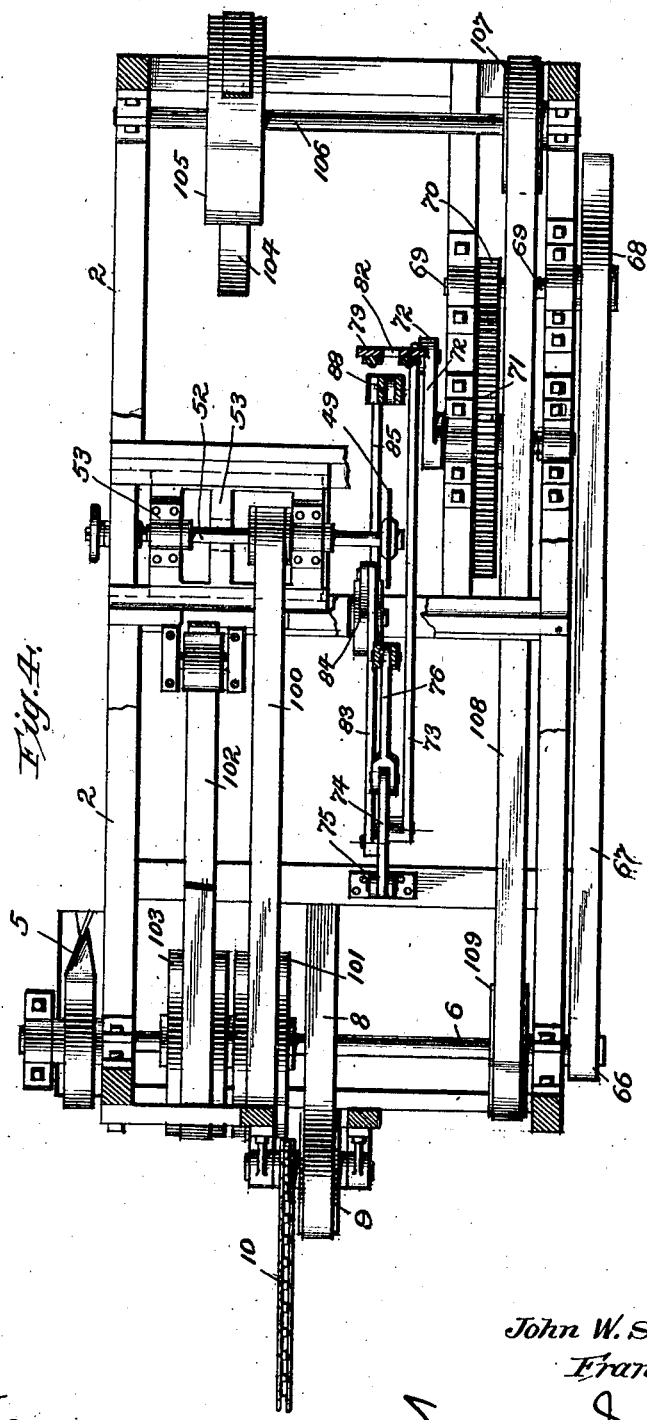

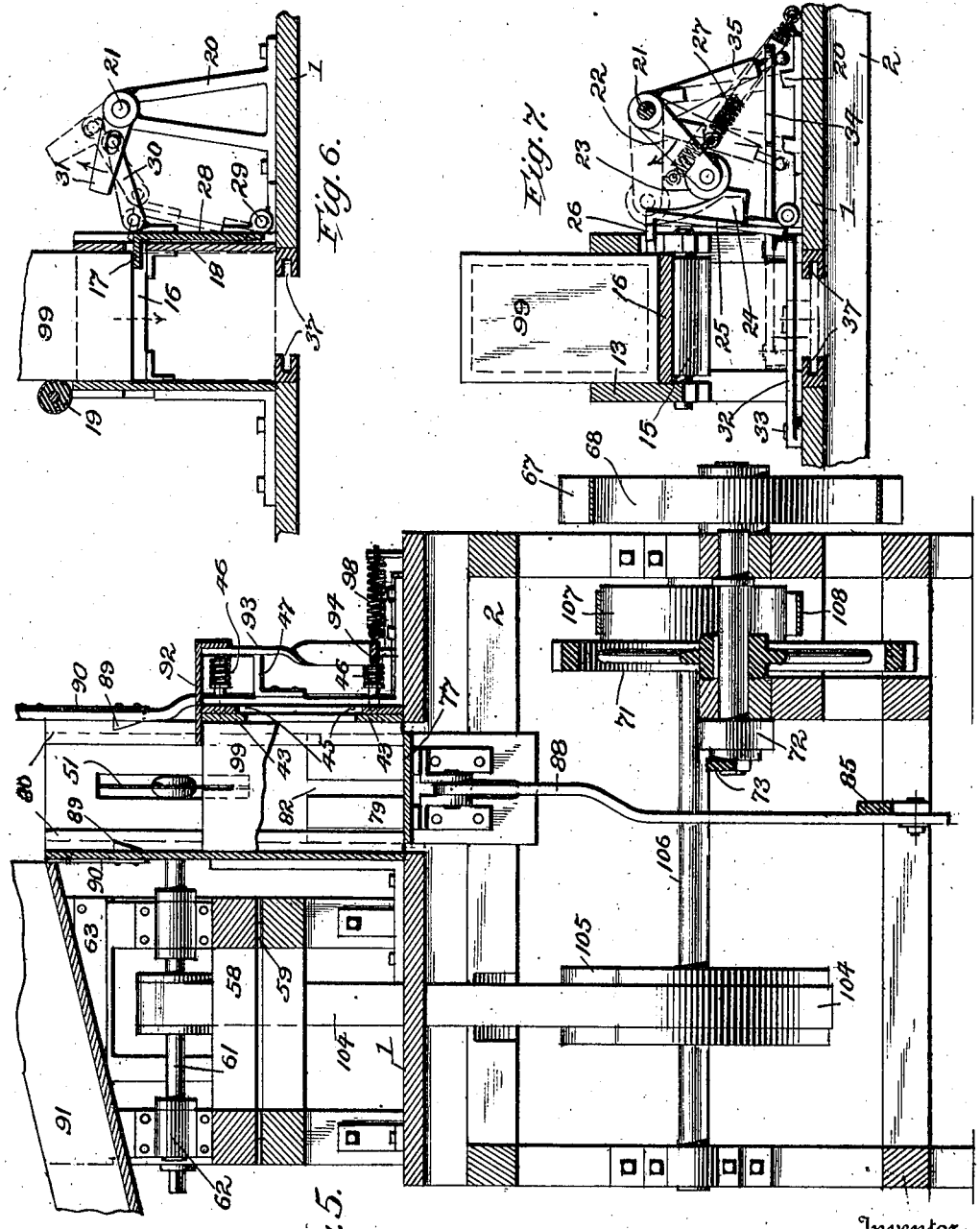

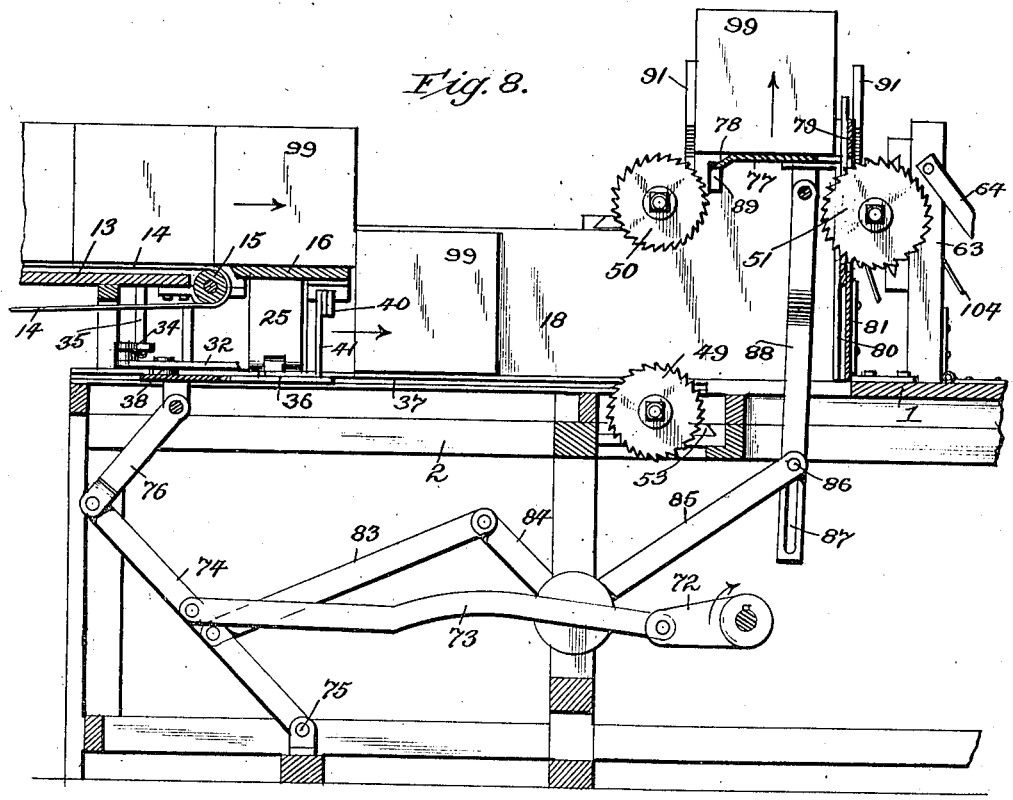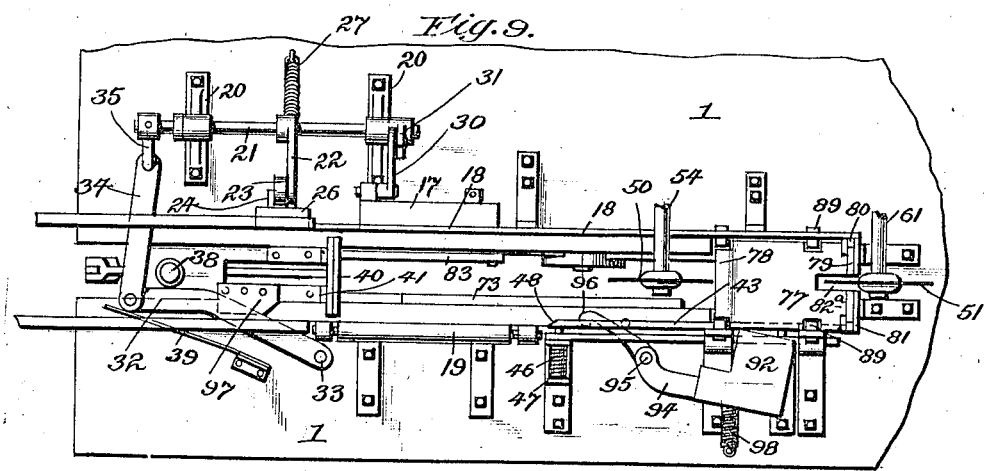

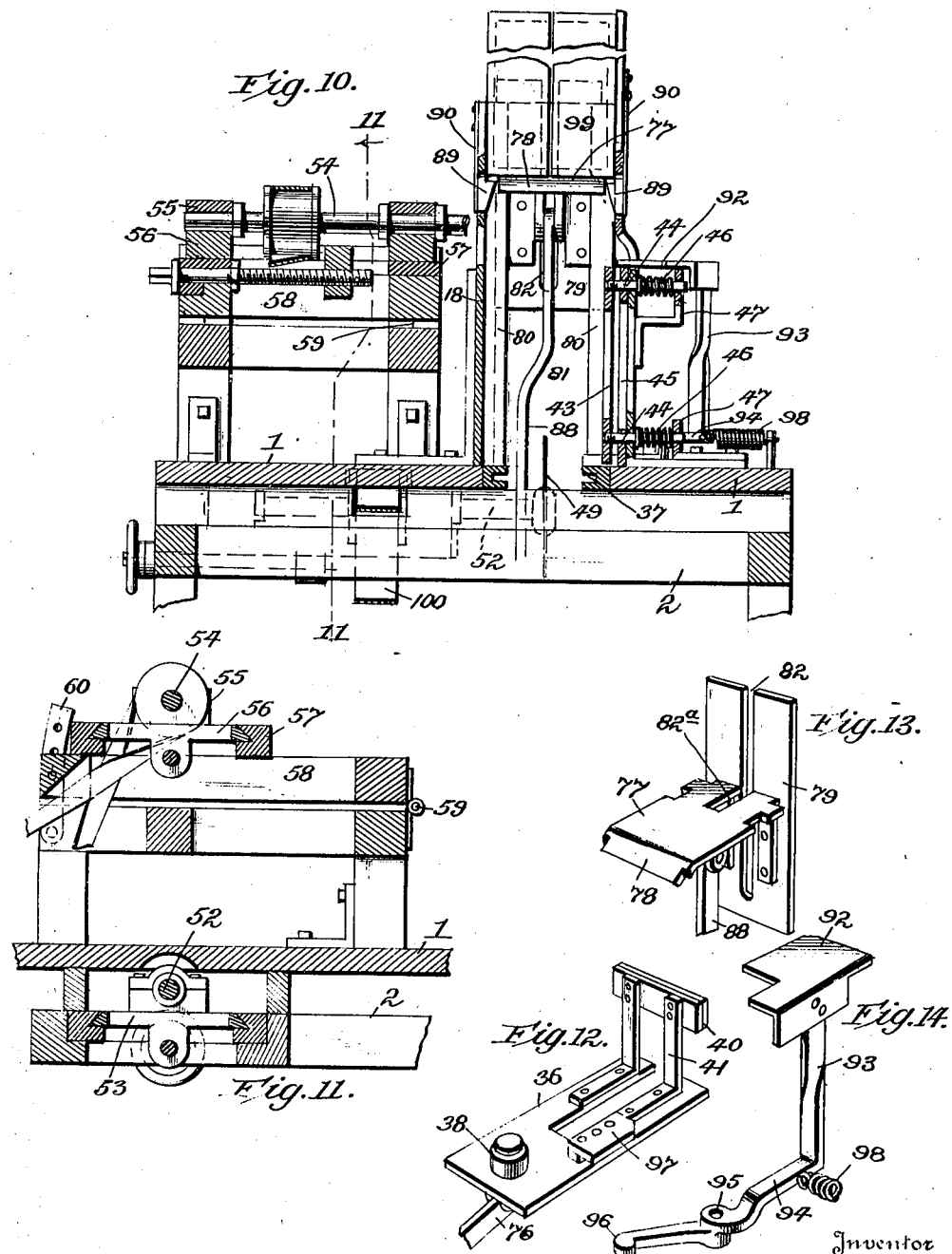

UNITED STATES PATENT OFFICE.

JOHN W. SCHLEICHER AND FRANK M. BOYER, OF ST. LOUIS, MISSOURI, ASSIGNORS TO MENGEL BOX COMPANY, OF LOUISVILLE, KENTUCKY, A CORPORATION OF NEW JERSEY.

MACHINE FOR CUTTING BOXES.

1,206,925.  Specification of Letters Patent.  Patented Dec. 5, 1916.

Application filed July 19, 1915. Serial No. 40,711.

*To all whom it may concern:*

Be it known that we, JOHN W. SCHLEICHER and FRANK M. BOYER, citizens of the United States, residing at St. Louis, in the State of Missouri, have invented certain new and useful Improvements in Machines for Cutting Boxes, of which the following is a specification.

This invention pertains to an improved machine for cutting boxes, and has for its object the production of a construction which will rapidly and economically cut or split a complete box (one composed of four sides and two ends or heads completely glued or nailed up) into two sections or into a body section and a top.

The machine is illustrated in the annexed drawings, wherein:

Figure 1 is a side elevation thereof; Fig. 2 a top plan view of the same; Fig. 3 a longitudinal sectional view, on the line 3—3 of Fig. 2; Fig. 4 a horizontal sectional view, on the line 4—4 of Fig. 3; Fig. 5 a transverse vertical sectional view, on a somewhat enlarged scale, on the line 5—5 of Fig. 1; Fig. 6 a detail sectional view of the removable box-sustaining platform; Fig. 7 a similar view of the arresting mechanism employed in conjunction with the box-feeding devices; Fig. 8 a longitudinal sectional view, similar to Fig. 3, the parts being differently positioned and showing a box being fed into the machine and a split box being elevated; Fig. 9 a top plan view, the parts being in the same relative position as shown in Fig. 8; Fig. 10 a transverse vertical sectional view, taken on the line 10—10 of Fig. 1, the parts being in the same position as those shown in Figs. 8 and 9; Fig. 11 a detail sectional view, taken on the line 11—11 of Fig. 10, and showing the manner in which two of the saw-arbors are mounted; Fig. 12 a detail perspective view of the pusher and its allied parts, employed for forcing the boxes forwardly to make the initial cut in two of the sides thereof; Fig. 13 a similar view of the platform or elevator upon which the partially-cut boxes come to rest and are then passed or forced upwardly to cut the remaining sides; Fig. 14 a similar view showing the hold-down device for the boxes, employed as the initial cuts are being completed and a box is moved onto the platform or elevator shown in Fig. 13; Fig. 15 a perspective view of one of the wholly or completely-formed boxes, comprising four sides and two ends or heads; Fig. 16 a like view showing the boxes having the initial pair of cuts formed therein at the opposite sides of the same; Fig. 17 a like view showing the box completely cut; and Fig. 18 a similar view showing the two sections of the box separated.

From the point of economy and for other reasons, it is advantageous to make up a box which is completely closed, as shown in Fig. 15; that is to say, a box comprising four sides, a top and bottom, or heads, and to thereafter sever the same forming two open boxes, or, according to the adjustment of the machine, a box and a top. The machine which forms the basis of the present invention is designed to take such a built-up structure, and to sever it according to the requirements. The machine is substantially automatic in its operation and may be said to comprise means for feeding a plurality of boxes to a pusher or advancing means which forces the boxes in between a pair of saws which cut the oppositely-disposed sides, the boxes then coming to rest upon a movable platform or elevator and being moved in a direction at right angles to their previous movement and between another pair of saws which completely sever the opposite sides and thus produce two boxes or a box and a top, as the case may be. Under the construction employed, one saw is common to both pairs of saws.

Referring to the drawings, 1 denotes a bed or table surmounting a suitable framework denoted as a whole by 2 and by which the driving mechanism is carried. Power is derived from a driving pulley 3 mounted upon a driven shaft 4 (see Fig. 3) and a belt 5 imparts motion to a countershaft 6. Shaft 4 also carries a second pulley 7 and a belt 8, passing around the same and around a third pulley 9 (shown in Figs. 1, 3 and 4) imparts motion to a sprocket wheel mounted upon the shaft carrying the pulley 9, said sprocket wheel in turn imparting motion to a sprocket chain 10, which at the upper run thereof passes about a sprocket wheel 11, secured upon a shaft 12 which is supported at the outer end of a platform or runway 13, through which the boxes are fed forwardly. An endless belt 14 passes about a pulley secured upon the shaft 12, and also about a second pulley 15 (see Figs. 3 and 8) carried at the inner end of the runway 13. The motion of this belt is continuous, and tends to deliver the boxes upon a fixed platform 16, which stands in line with the inner end of the run of the belt and in line with a reciprocating shelf 17, which extends inwardly through a fixed side wall 18, forming one member of the runway through which the boxes are advanced to the initial pair of saws. That portion of the wall of the runway directly opposite the movable shelf 17 is fixed and carries at the upper portion thereof a roller 19 of a length substantially equal to that of the box to be cut. As the boxes are fed inwardly over the platform 16 and onto the movable shelf 17, they contact with the roller and immediately the shelf is withdrawn they will drop, facilitated in such movement by the roller. To arrest the movement of the advancing line of boxes while the shelf is being withdrawn to lower the box at that moment positioned thereon it is necessary to employ a stop mechanism and such a structure is shown in detail in Figs. 2, 3, 7 and 9. Mounted upon the table 1 is a pair of standards 20, in which is journaled a rock-shaft 21, said shaft having secured to it an arm or lever 22, carrying at its outer or free end a roller 23 which contacts with a cam 24 fixed to the outer face of an arm 25 fulcrumed at its lower end and provided at its upper end with an inwardly-extending stop finger 26, said finger, when the parts are brought into the dotted-line position shown in Fig. 7, being protruded inwardly into the box runway and forced against the box in line therewith, thereby holding said box and those which are behind the same. The conveyer belt 14 at such time continues its motion but slides beneath the boxes. A spring 27 is connected to the arm 22 and to the table 1 and serves to draw the arm downwardly and to thus rock the shaft 21 in one direction. Said shaft also actuates the movable shelf 17. The shelf, as will be seen upon reference to Figs. 2 and 6, is carried at the upper end of a plate 28, hinged at 29 and moved inwardly and outwardly by a link 30, said link being pin-jointed to an arm 31 secured to the shaft 21. The parts are so arranged that as the shelf 17 is withdrawn the stop finger 26 is protruded inwardly into contact with the box immediately in rear of the box then resting upon the shelf 17. Said shelf will, upon return movement of the parts, be protruded inwardly in line with the fixed table or platform 16, in position to receive the on-coming box which at such time is released by the stop finger 26.

In order to actuate the rock shaft against the tension of the spring 27 a lever 32 (best shown in Figs. 2 and 9) is pivoted at 33 to the table 1, the other end of the lever being pivotally connected to a link 34, the opposite end of the link being connected to the lower end of a depending arm or lever 35, secured to the outer end of the rock shaft 21. Said lever 32 is angled, as shown, and lies across the bed in line with the path of movement of a reciprocating slide 36 (shown in detail in Fig. 12). Said slide is mounted in guides or ways 37 and carries a roller 38 adapted to contact with the lever 32, and to swing the same rearwardly from the position shown in Fig. 2 to that illustrated in Fig. 9. An additional flat spring, 39, may be secured to the bed 1, and contacts with the lever 32, being placed under stress thereby when the parts are in the positions shown in Fig. 9, or when the slide 36 is retracted. This spring assists the spring 27 in the movement of the parts when the roller 38 is moved out of contact with the lever 32.

The boxes as they are dropped one by one from the removable shelf come to rest upon the upper faces of the guideways 37 and in front of a push-bar 40 carried by brackets or arms 41, secured to the slide 36. The side wall 18 of the channel through which the boxes are advanced to the saws is fixed, while the opposite side, adjacent the initial pair of saws, is made yielding. It may be said to comprise a yielding wall or frame 43 held by a plurality of rods 44 which extend horizontally through a fixed wall 45, the rods being surrounded by springs 46, which bear against collars secured to the rod and fixed brackets 47. The springs tend normally to force the yielding wall 43 inwardly, but in case a box should be slightly over-size the wall will yield sufficiently to permit the box to enter without damage to the mechanism. As will be seen upon reference to Fig. 9, the forward end of the wall 43 is inclined or beveled, as at 48, so that a box can be entered without difficulty. This spring-pressed wall tends to hold the box up against the opposite fixed wall and to properly position the same with reference to the saws. 49 indicates the lower saw and 50 the upper saw of the first pair, said saw 50 likewise forming with a third saw 51 a second pair of saws. Saw 49 is secured to an arbor 52 (Figs. 4, 10 and 11) mounted in bearings which are secured to an adjustable slide 53, so that the saw may be positioned laterally with reference to the channel through which the boxes are advanced in the act of cutting. The saw 50 is mounted upon an arbor 54, said arbor being journaled in a bearing 55 secured to a laterally adjustable slide 56. Said slide in turn is mounted in ways 57 secured to a frame 58 hinged at 59 at one end and held in its vertical adjusted position at its opposite end by a rack bar 60.

It will thus be seen that both of the saws 49 and 50 may be adjusted laterally and the distance between them may be likewise varied by raising and lowering the frame 58 and the machine accommodate different sized boxes, as well as permitting the box to be cut along lines at different distances from the bottoms or heads thereof.

The third saw, 51, is carried by an arbor 61, see Figs. 1, 2, 3, 5 and 8, and is mounted in bearings 62, which bearings in turn are mounted for lateral adjustment in the upper end of a vertically-disposed frame 63, said frame being hinged at its lower end and held in its adjusted position by arms or brackets 64 which, as will be seen upon reference to Figs. 2 and 3, are slotted at their lower ends, as at 65, and adjustably secured to the bed 1 by means of bolts. Thus the frame and consequently the saw 51, may be moved toward or from its companion saw 50, and may likewise be adjusted laterally to conform to the lateral adjustment of the saw 50.

The slide 36 is reciprocated back and forth through the connections best shown in Figs. 1, 2, 3 and 8. Secured to the counter-shaft 6, at one end thereof, is a pulley 66, about which passes a belt 67, said belt also passing about a large band-wheel 68 secured to a short shaft 69, which shaft carries a pinion 70, meshing with a relatively large gear 71. The shaft upon which the gear 71 is mounted is provided with a crank 72, and a pitman 73 extends from said crank and is connected to a rocking lever 74, fulcrumed at 75, at its lower end, and pivotally connected at its upper end to a link 76, which link in turn is pivotally secured to the lower portion of the slide 36. When the parts are in the positions shown in Fig. 3, and the slide is moved forwardly to its extreme position, the push-bar 40 will have forced the box between the saws 49 and 50, and cut two sides thereof, as indicated in Fig. 16. As shown in dotted lines in Fig. 3, the box is at such time clear of all the saws and comes to rest upon the upper face of a platform 77, the forward edge 78 of which is slightly inclined in a downward direction, in order that the box may be moved thereon without difficulty. Said platform is secured to a slide 79 which moves in guideways 80 carried by a vertically-extending wall 81, which is slotted to permit the saw 51 to protrude therethrough. The slide 79 is likewise provided with an elongated slot 82, and the platform 77 has a slot 82ª formed therein in line with the slot 82, so that the saw is unobstructed in its action upon the box as the slide and platform 77 are moved upwardly in the act of forcing a box between the saws 50 and 51 to produce the final cuts in the sides, as shown in Fig. 17.

The platform 77 and its attached slide are actuated from the lever 74, a link 83 (see Figs. 3 and 8) being connected to said lever and to the short arm 84 of a bell-crank, the opposite arm, 85, having a pin 86 which extends into and works in a slot 87 formed in the lower end of a pusher-bar 88, pivoted to the under side of the platform 77. As the slide 36 is retracted or begins its retrograde movement, the arm 85 moves upwardly, and when the pin reaches the upper end of the slot the push-bar 88 will elevate the platform and carry the partially-cut box upwardly between the saws 50 and 51, thus completing the severance of the box which, when the platform is fully elevated, rides past the cam faced dogs 89 which extend inwardly from the side walls of the vertically-disposed guideway and retain the severed box portions in their elevated positions when the platform 77 begins its downward movement. Said members 89 are supported at the lower free end of spring arms 90. The next succeeding severed box tends to lift the previously severed box, or box-section, from the dogs or detents 89, and they drop over into the channel or way 91 (Figs. 5 and 8) down which they slide to a suitable conveyer or the like.

In order to prevent the box from jumping or chattering as it nears the limit of its horizontal movement between the saws 49 and 50 and is passing onto the elevator, there is provided a hold-down, shown in detail in Fig. 14, and likewise shown in Figs. 1, 2, 5, 8, 9 and 10. It may be said to comprise a horizontally disposed plate 92, adapted to be protruded inwardly over the advancing boxes, said plate in its protruded position overlying the platform 77, which at such time is in its lowest position and at rest. The plate 92 is secured to the upper end of the vertically-disposed arm 93 formed as an integral portion of one arm of the lever 94, which lever is fulcrumed, as at 95, on the bed 1, the opposite end of the lever being rounded as at 96, and extending inwardly in line with a cam-block 97, secured to the slide 36. A spring 98 normally rocks the lever so as to withdraw the hold-down plate 92, but as the slide advances in the act of pushing a box between the saws 49 and 50, the cam 97 contacts with the rounded end 96 of the lever 94 and forces the hold-down plate 92 inwardly from the position shown in Figs. 9 and 10 to that shown in Figs. 2 and 5. The box is designated in the drawings where it is positioned in the machine by the numeral 99.

The saw 49 is operated by a belt 100, which passes about a suitable band-wheel 101, mounted upon shaft 6. The saw 50 is driven by a similar belt 102, passing about a band wheel 103, also mounted upon shaft 6. Saw 51 is driven by a belt 104 (Figs. 1 and 3) which passes about a band wheel 105, mounted upon a counter-shaft 106, which shaft carries a second band wheel 107. A belt 108 passes about said band wheel and about a band wheel 109 secured to the shaft 6.

It is thought that the operation of the machine will be understood from the foregoing description. It will be appreciated that all the attendant has to do is to place the boxes upon the conveyer belt 14, and to keep the proper supply thereon. The boxes are then automatically removed from the belt one by one, forced inwardly between the initial pair of saws 49 and 50, thence onto the vertically-movable platform, which at that time is lowered, and then forced upwardly between the saws 50 and 51, cutting the two remaining uncut sides and thus completely dividing the box into two parts, or into a box and lid, according to the lateral adjustment of the saws. By translating the movement of the box at a right line from the initial cut to bring about the second cut, no shifting or turning of the box is necessary, and three saws only are necessary to produce four cuts, essential to a complete severance of the box into two parts.

Having thus described our invention, what we claim is:

1. In a machine of the character specified, the combination of three saws; means for passing a box between two of said saws and thereby cutting two opposite sides of the box; and means for then passing the box between one saw of said pair and the third saw, for cutting the remaining sides of the box.

2. In a machine of the character specified, the combination of three saws arranged in pairs, with one saw common to each pair; means for forcing a box between one pair of saws; and means, acting at right angles to said first means, for forcing the partially-severed box between the second pair of saws.

3. In a machine of the character specified, the combination of three saws arranged in pairs, with one saw common to each pair; means for securing lateral adjustment of said saws; means for forcing a box between one pair of saws; and means for then forcing the box between the second pair.

4. In a machine of the character specified, the combination of three saws arranged in pairs, with one saw common to each pair; means for forcing a box between one pair of saws; an elevator lying in the path of movement of the box and beyond said saws and adapted to receive the partially-severed box; and means for actuating said elevator to carry the box between the second pair of saws.

5. In a machine of the character specified, the combination of a plurality of saws all moving and cutting in a common plane and arranged in related pairs; means for forcing a box between one pair of saws; and means acting at right angles to said first-named means for forcing the box between a second pair of saws.

6. In a machine of the character specified, the combination of a plurality of saws all moving and cutting in a common plane and arranged in related pairs; means for forcing a box between one pair of saws and onto an elevator; said elevator; and means for actuating said elevator to force the box between a second pair of saws.

7. In a machine of the character specified, the combination of a plurality of saws arranged in related pairs; means for forcing a box between one pair of saws; an elevator adapted to receive the box as it passes from said saws; a hold-down device for the box as it moves onto said elevator from the saws; means for actuating said elevator to carry the partially-severed box between a second pair of saws, and means moving the hold-down device into and out of operative relation with the elevator and the box thereon.

8. In a machine of the character specified, the combination of a plurality of saws; a channel extending in line with the first pair of saws; a slide movable back and forth in said channel and adapted to advance a box between said first pair of saws; an elevator onto which the box passes as it leaves said saws; means for actuating said elevator to carry the box between the second pair of saws; a normally-retracted hold-down device for the box arranged in rear of the first pair of saws; and means actuated by the slide for throwing said hold-down device into operative relation with the box as the box leaves the saws and moves onto the elevator.

9. In a machine of the character specified, the combination of a plurality of saws arranged in related pairs; a runway or channel adapted to guide the boxes to be severed to the first pair of saws; a slide mounted in said channel and adapted to force the boxes between the saws; an elevator located in rear of said first pair of saws and onto which a partially-severed box is passed; a hold-down device arranged laterally of said elevator; connections between said slide and hold-down device, whereby the latter is thrown into operation as the box is advanced onto the elevator and thereafter withdrawn; and means for actuating the elevator and thereby forcing the box between the second pair of saws to cause the final severance of the box.

10. In a machine of the character specified, the combination of a plurality of saws all lying in a common operating plane and arranged in related pairs; means for forcing a box between one pair of saws; an elevator adapted to receive the box as it passes from said saws; means for actuating said elevator and thereby forcing the partially-severed box between the second pair of saws; and means for holding said severed box out of contact with the saws upon a retrograde movement of the elevator.

In testimony whereof we have signed our names to this specification.

JOHN W. SCHLEICHER.
FRANK M. BOYER.